United States Patent

Henry, Jr.

[11] Patent Number: 5,930,727
[45] Date of Patent: Jul. 27, 1999

[54] ANALOG FAX AND MODEM REQUESTS IN A D-AMPS MULTI-LINE TERMINAL SYSTEM

[75] Inventor: Raymond Charles Henry, Jr., Wake Forest, N.C.

[73] Assignee: Ericsson Inc., Research Triangle Park, N.C.

[21] Appl. No.: 08/505,665

[22] Filed: Jul. 21, 1995

[51] Int. Cl.⁶ .................................................. H04Q 7/20
[52] U.S. Cl. ......................... 455/557; 455/550; 455/553
[58] Field of Search ..................... 379/59, 63, 58, 379/100.01; 455/33.1, 54.1, 557, 550, 553, 556

[56] References Cited

U.S. PATENT DOCUMENTS

| | | |
|---|---|---|
| 4,718,080 | 1/1988 | Serrano et al. . |
| 4,775,997 | 10/1988 | West, Jr. et al. . |
| 4,837,800 | 6/1989 | Freeburg et al. . |
| 4,843,622 | 6/1989 | Yotsutani et al. . |
| 4,881,271 | 11/1989 | Yamauchi et al. . |
| 4,959,851 | 9/1990 | Tobolski, Jr. et al. . |
| 4,975,939 | 12/1990 | Sasaki . |
| 4,991,197 | 2/1991 | Morris . |
| 5,109,400 | 4/1992 | Patsiokas et al. . |
| 5,123,043 | 6/1992 | Higashiyama et al. . |
| 5,173,933 | 12/1992 | Jabs et al. . |
| 5,228,074 | 7/1993 | Mizikovsky . |
| 5,267,261 | 11/1993 | Blakeney, II et al. . |
| 5,280,472 | 1/1994 | Gilhousen et al. . |
| 5,283,817 | 2/1994 | Hara et al. . |
| 5,285,469 | 2/1994 | Vanderpool . |
| 5,291,544 | 3/1994 | Hecker . |
| 5,303,287 | 4/1994 | Laborde . |
| 5,311,570 | 5/1994 | Grimes et al. . |
| 5,321,737 | 6/1994 | Patsiokas . |
| 5,323,446 | 6/1994 | Kojima et al. . |
| 5,396,539 | 3/1995 | Slekys et al. . |
| 5,404,579 | 4/1995 | Obayashi et al. . |
| 5,422,932 | 6/1995 | Kay et al. ................................. 379/59 |
| 5,479,480 | 12/1995 | Scott ......................................... 379/59 |
| 5,504,803 | 4/1996 | Yamada et al. .......................... 455/422 |
| 5,550,893 | 8/1996 | Heidari ....................................... 379/59 |
| 5,564,072 | 10/1996 | Garica Aquilera et al. ............... 379/59 |
| 5,564,077 | 10/1996 | Obayashi et al. ........................ 455/422 |
| 5,590,406 | 12/1996 | Bayley et al. ............................ 455/422 |
| 5,710,986 | 1/1998 | Obauashi et al. ........................ 455/553 |

FOREIGN PATENT DOCUMENTS

| | | |
|---|---|---|
| 661 893 | 7/1995 | European Pat. Off. . |
| 94/18782 | 8/1994 | WIPO . |
| WO95/14359 | 5/1995 | WIPO . |

OTHER PUBLICATIONS

J.M. Garcia Aguilera, "Fixed Cellular Access," Electrical Communication, pp. 43–46 (Jan. 1995).

R.B. Haugen et al., "Radio in Local Loop for Rural & Sub–Urban Environments," IEEE International Conference on Personal Wireless Communications, pp. 17–24 (Aug. 18, 1994).

Inter–Tel and Qualcomm Sign Development Agreement for CDMA Wireless Local Loop Products, PR Newswire Association, Inc., Financial News (Mar. 1, 1996).

Primary Examiner—Wellington Chin
Assistant Examiner—Keith Ferguson
Attorney, Agent, or Firm—Burns, Doane, Swecker & Mathis, L.L.P.

[57] ABSTRACT

A method and apparatus allow a multi-line telephone user in a cellular network to notify a fixed cellular terminal supporting both analog and digital voice channels and/or its controller to request an analog channel for an incoming or outgoing modem, prior to the call. For analog FAX transactions, the cellular terminal automatically requests the analog channel after detecting the starting tones associated with the FAX transaction. This assures that the fixed cellular terminal will set up an analog channel for the incoming or outgoing analog modem data or FAX data, so that the data can be transmitted to and from the analog multi-line user. In the absence of notification of a modem call or fax start tones call, the fixed cellular terminal can use a digital voice channel to transmit voice data, so that more data can be transmitted per frequency band.

8 Claims, 5 Drawing Sheets

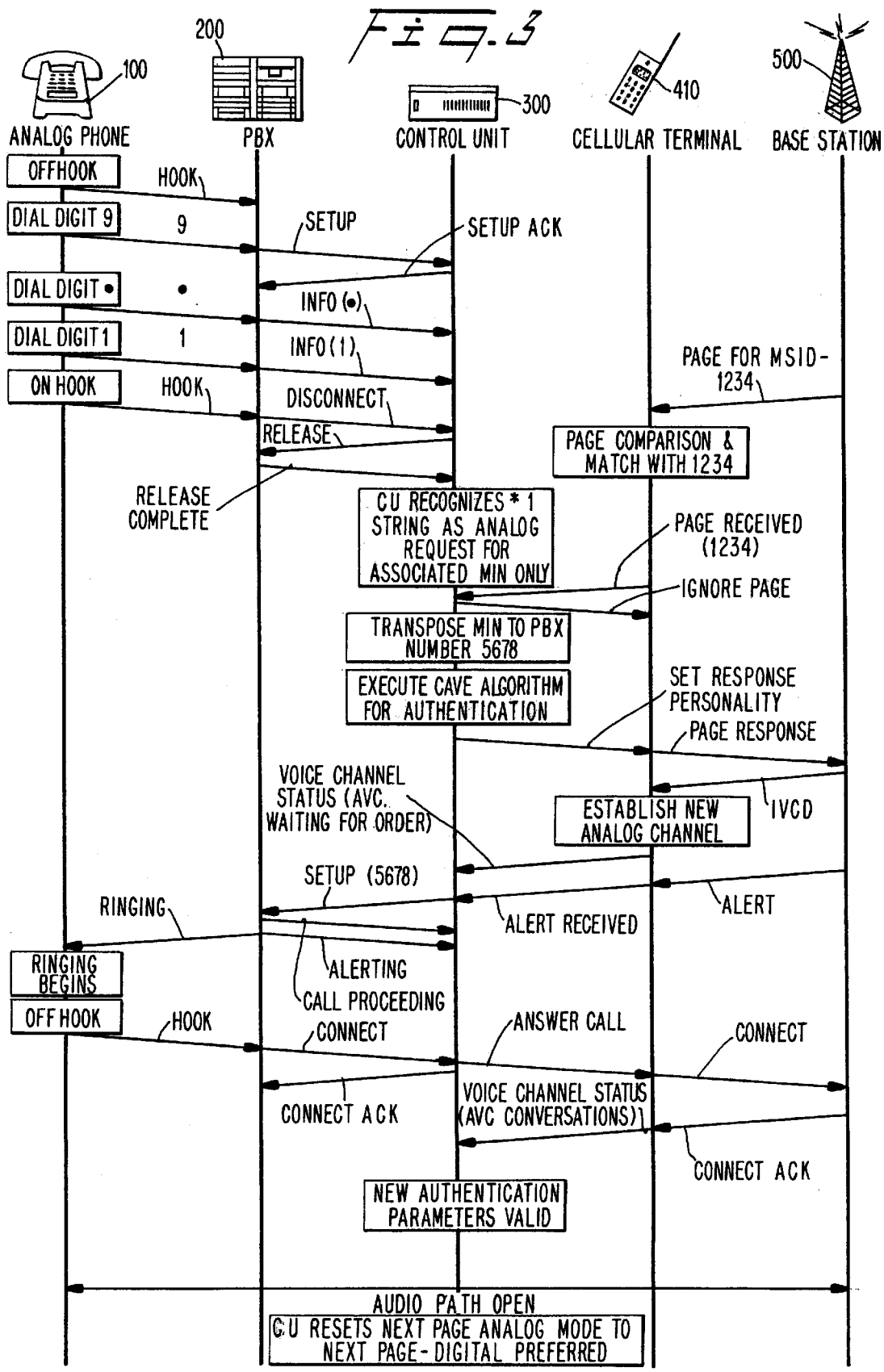

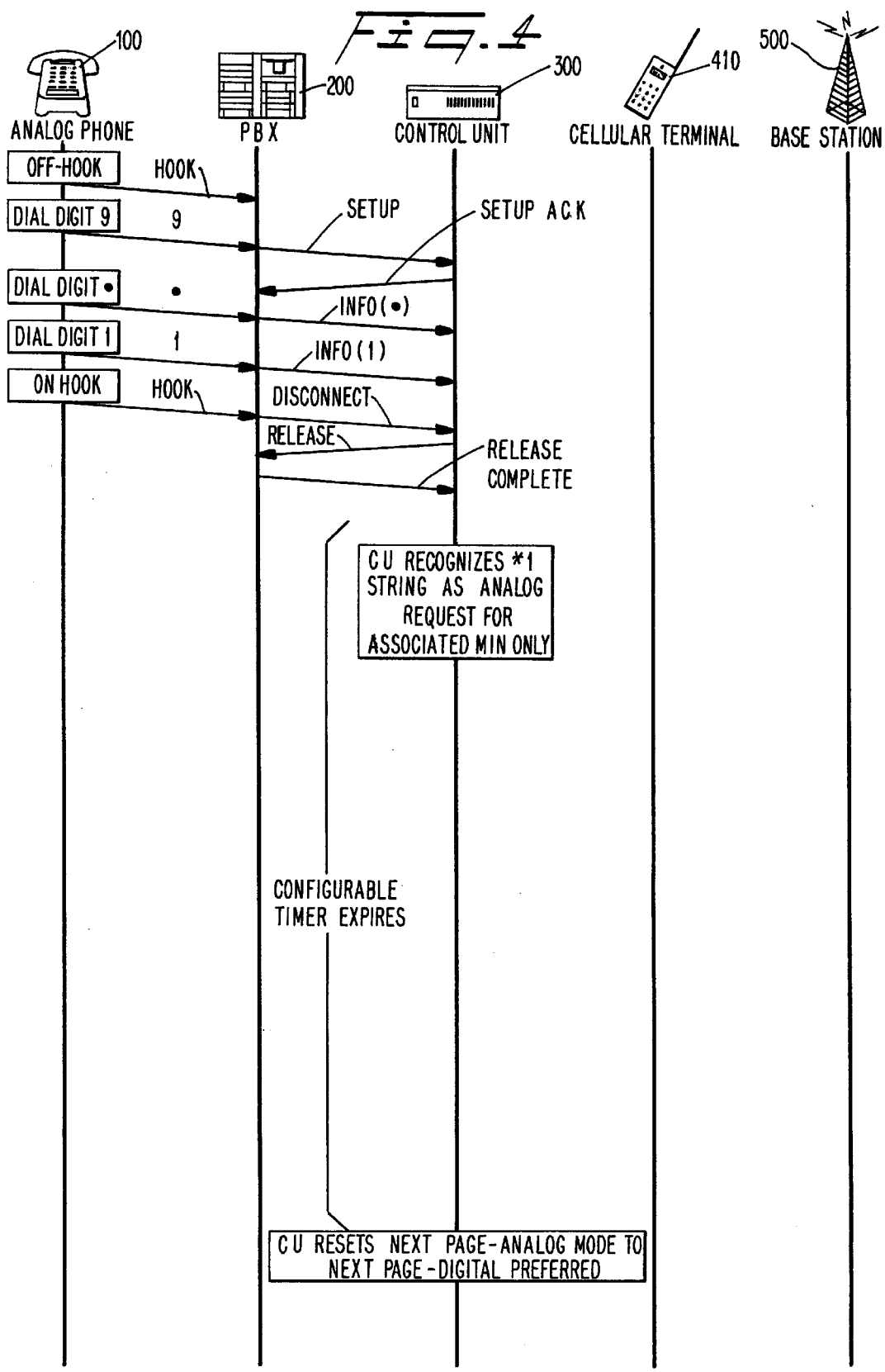

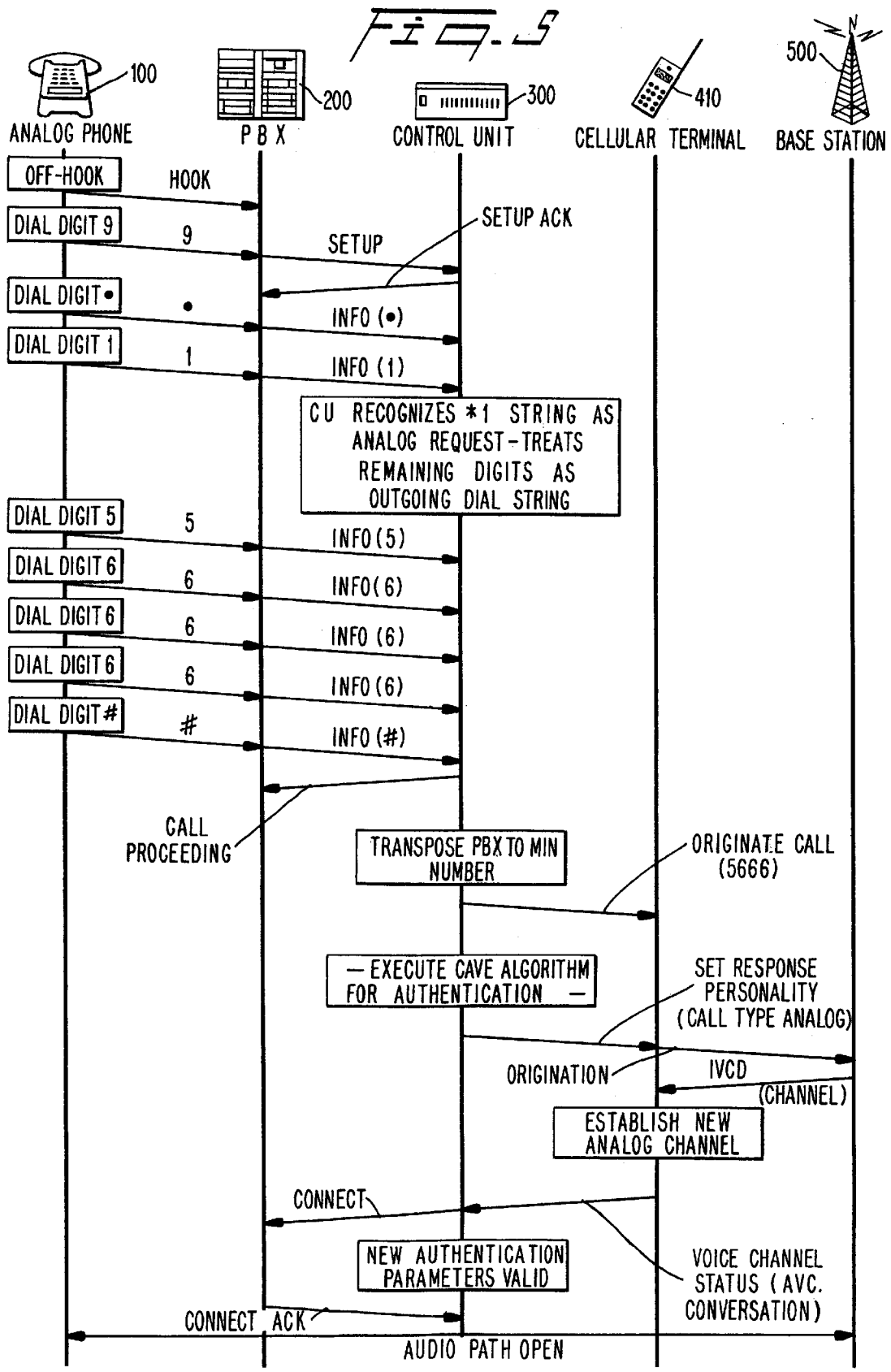

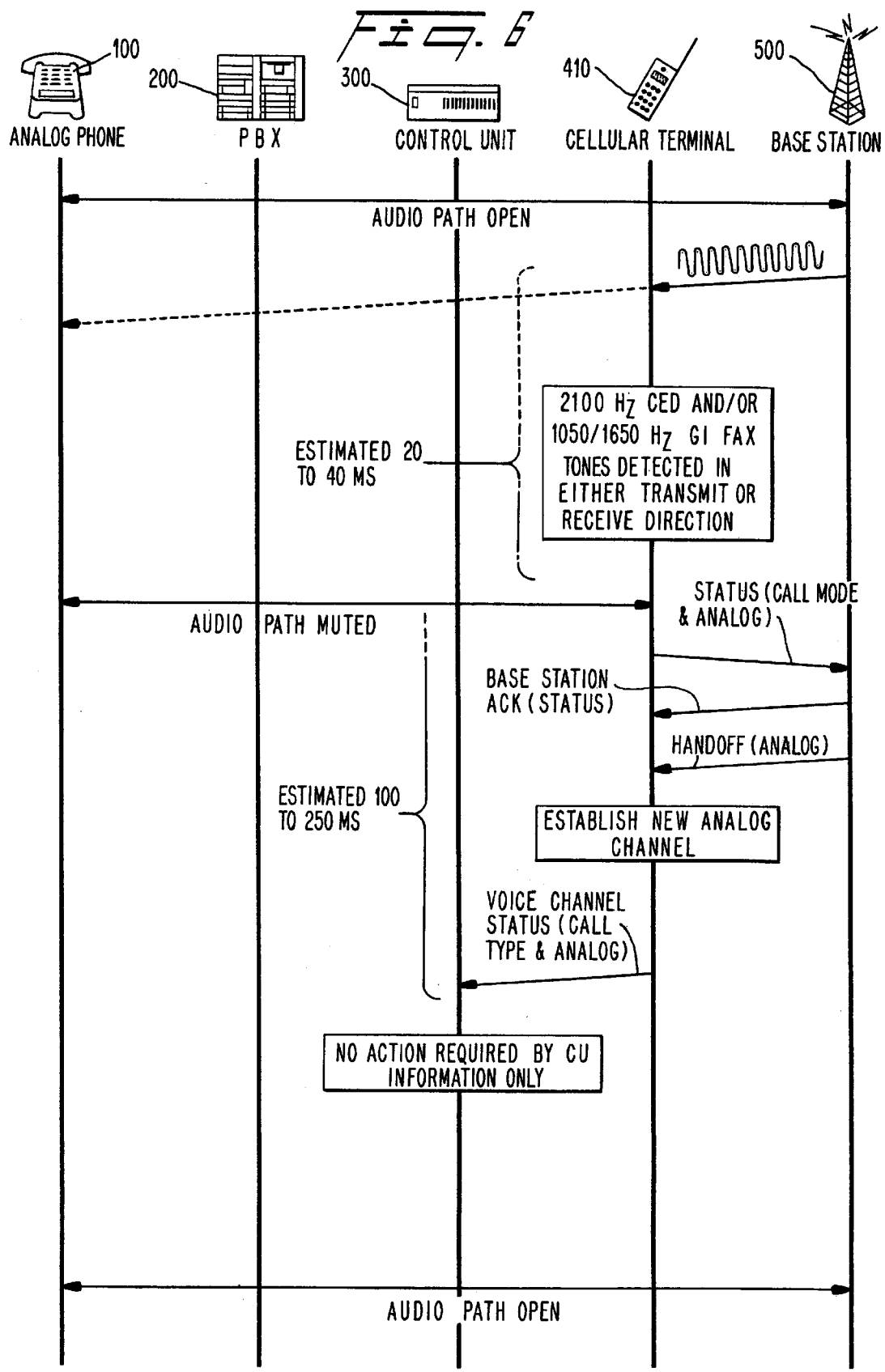

ANALOG FAX AND MODEM REQUESTS IN A D-AMPS MULTI-LINE TERMINAL SYSTEM

BACKGROUND

This invention relates to methods and systems for cellular telecommunications, and more particularly to a multi-line telephone terminal system that enables multiple analog terminals to communicate via fixed cellular terminals supporting analog and digital voice channels.

Cellular radio telephone systems provide for communication among mobile stations and fixed telephone networks without requiring expensive wiring. Typically, a cellular system includes cellular transceivers or terminals that enable calls to be transmitted to and received from the network. Standard analog phone terminals can be interfaced with fixed cellular terminals so that a call can be set up at or received from an analog terminal via a fixed cellular terminal, avoiding the need for wiring to and from the analog terminal. The fixed cellular terminal alerts the analog terminal when an incoming call is received, causing the analog terminal to ring.

Several systems have been proposed for interfacing a standard telephone to a standard fixed cellular terminal. For example, U.S. Pat. No. 4,718,080 discloses a system in which, after a telephone number is dialed at a standard terminal, a SEND signal is simulated and the digits are transmitted to the cellular transceiver. Dialing sequences can also be entered at the standard terminal to control features of the standard terminal such as volume control. U.S. Pat. No. 4,775,997 discloses a system in which a SEND signal is transmitted to a cellular terminal after the last digit has been dialed at the standard terminal. The system determines whether the last digit has been dialed based on the elapsed time or count of digits dialed after a certain digit has been dialed. U.S. Pat. No. 4,959,851 discloses a system which enables predetermined dialing sequences consisting of leading and trailing function digits to be entered at a standard terminal to select features of a cellular terminal.

Conventional systems such as those described above use analog channels to transmit voice calls, FAX data and modem data to and from an analog terminal via a fixed cellular terminal. These types of systems employ standards such as the AMPS standard for analog modulation. In such systems, voice calls, FAX data and modem data are represented as analog signals.

It is desirable to provide a system supporting digital channels, enabling more voice calls in a given frequency bandwidth. A new standard, IS-54, has been produced by the Electronic Industries Association/Telecommunications Industry Association (EIA/TIA) to support both analog and digital voice channels. According to this standard a "dual mode" cellular terminal is provided that supports both analog and digital voice channels. Voice coders are provided to code and decode voice data. Control signals and supervisory messages are communicated between the cellular terminal and a base station across a Fast Associated Control Channel (FACCH) if the base station is operating on a digital voice channel or through the use of blank and burst Frequency Modulated (FM) data if the base station is operating on an analog voice channel.

A dual mode system supporting digital and analog channels can transmit voice data over a digital channel using voice coders, but conventional modem data or FAX data cannot be transmitted over digital voice channels. This is because conventional modem data and FAX data consist of tones which the digital channel voice coders are not optimized to reproduce accurately. To transmit modem data and FAX data across a digital channel, conventional modems would have to be replaced with modems that produce data in a form that can be sent over the existing Time Division Multiple Access (TDMA) digital channel structure.

Since there is currently no provision for sending data over the TDMA digital channel in the IS-54 standard, the cellular terminal can automatically request or be notified to request an analog voice channel to handle the conventional modem or FAX data. If the cellular terminal continues to operate on a digital voice channel with modem or FAX data, the call will likely fail or will have sub-standard performance.

One way of overcoming this problem is for the analog user of the fixed cellular terminal to have a dedicated analog channel assigned to it from which it will receive or to which it will send modem or FAX data. This solution is cumbersome and costly, as it will necessarily set up calls as analog, even for digital voice capable calls, resulting in a waste of bandwidth.

Analog modem and FAX tones are similar in the way that they are sent at the beginning of a transaction. The tones are part of a recognition and negotiating exchange between the two end devices, according to the Committee Consultative International Telegraphique et Telephonique (CCITT) recommendations for modem and FAX protocols. The cellular terminal is able to detect the presence of these tones, even on a digital channel. This is advantageous in that the cellular terminal may initiate the request for an analog channel on its own without requiring the user to be involved or know what type of transaction is to take place.

Current analog FAX protocols have a long sequence of tones that can be detected by the cellular terminal. These are repeated in the case of a failure for as long as thirty seconds before the fax is sent or is determined to be a failure. This allows plenty of time for the cellular terminal to detect the tones and for the analog request transaction with the base station to take place. This is not the case for analog modem data protocols, however. They are very short in duration and have no overall retry attempts. This forces the user to become involved and initiate the analog request manually, prior to the call.

Thus, there is a need for a cellular system that permits a cellular terminal to automatically request an analog channel before a FAX call is initiated or to be notified to request an analog channel before a modem call is initiated, without actually having a full-time analog channel assigned.

SUMMARY

According to this invention, a method and apparatus are provided that allow an analog multi-line user to notify a fixed cellular terminal that supports both analog and digital voice channels and/or its controller to request an analog channel to be reserved for an incoming or outgoing modem call, prior to the call. For analog FAX transactions, the fixed cellular terminal automatically requests the analog channel after detecting the starting tones associated with the FAX transaction. This assures that the fixed cellular terminal will set up an analog channel for the incoming or outgoing analog modem data or FAX data, so that the data can be transmitted to and from the analog multi-line user. In the absence of notification of a modem call or detection of FAX starting tones, the fixed cellular terminal can use a digital voice channel to transmit voice data, so that more data can be transmitted per frequency band.

BRIEF DESCRIPTION OF THE DRAWINGS

The features and advantages of the invention will become apparent by reading this description in conjunction with the drawings, in which:

FIG. 3 illustrates how an incoming modem call is handled by the multi-line terminal system;

FIG. 4 illustrates how an incoming modem call time-out is performed by the multi-line terminal system;

FIG. 5 illustrates how a modem call is originated from the multi-line terminal system to an outside party; and FIG. 6 illustrates how a FAX call is handled by the multi-line terminal system.

DETAILED DESCRIPTION

Figure 1:
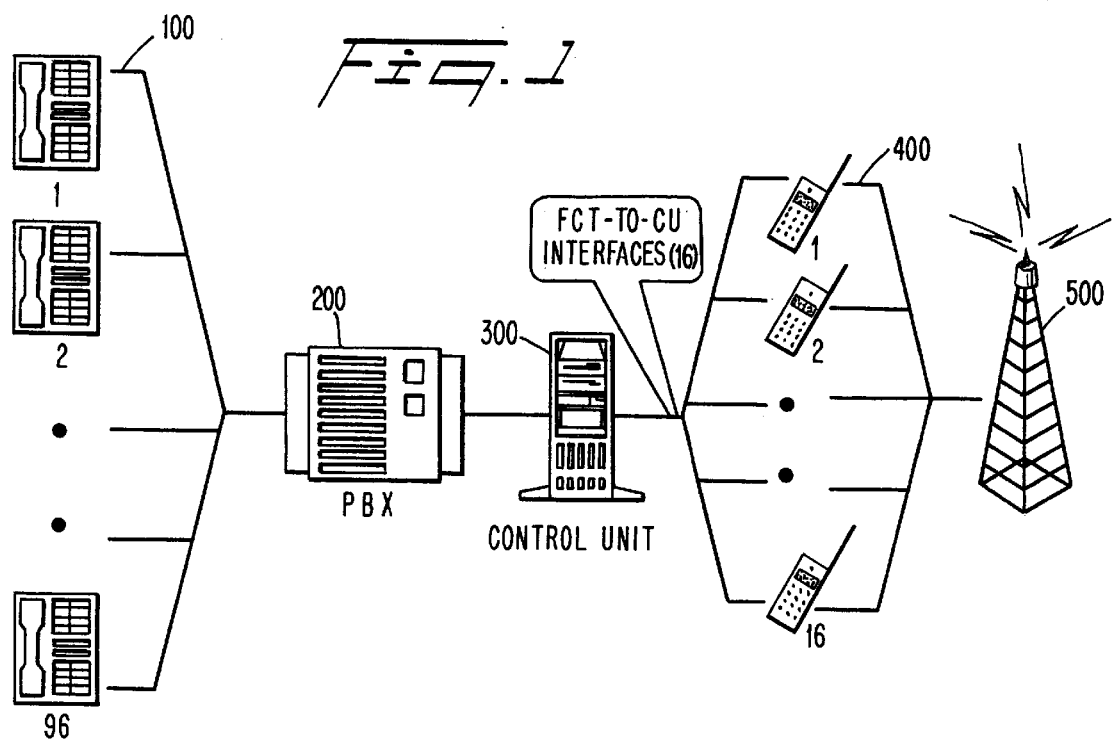
FIG. 1 depicts a multi-line terminal system according to the invention.

FIG. 1 depicts a multi-line terminal (MLT) system according to the invention. The MLT is part of a cellular network which includes terminals, base stations and equipment enabling communication between the terminals. The MLT system enables analog phone terminals 100 to be interfaced with fixed cellular terminals (FCTs) that support both digital and analog channels in a terminal subsystem 400 via a PBX 200 and a control unit (CU) 300. Data is sent and received at the analog terminals 100 to and from distant terminals in the cellular network, via a base station 500. Before a modem call is sent from or received at an analog terminal 100, the analog terminal notifies an FCT to request an analog channel. As a FAX call is sent or received, the FCT automatically requests an analog channel after detecting FAX tones. This permits outgoing modem calls and FAX calls from the analog terminal to be sent and incoming modem data and FAX data to be received over an analog channel via one of the FCTs, which also support communication on digital channels.

Figure 2:
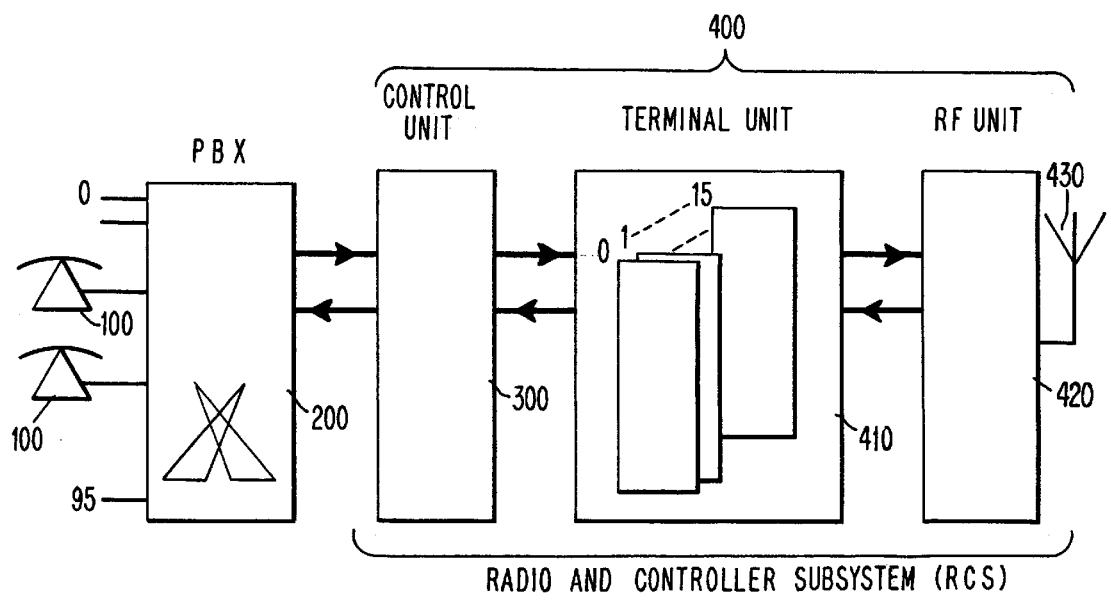
FIG. 2 depicts the architecture of a multi-line terminal system according to the invention.

FIG. 2 depicts the architecture of the MLT system, which comprises the PBX 200, the CU 300, and the terminal subsystem 400 comprising a terminal unit 410, a radio frequency (RF) unit 420, and an antenna 430. The terminal unit 410 advantageously includes a plurality of what are in essence conventional cellular transceivers. The CU 300, the terminal unit 410, the RF unit 420, and the antenna 430 make up a radio and controller subsystem (RCS). The MLT system depicted in FIG. 2 can multiplex a plurality of FCTs to a plurality of analog phone terminals 100 emanating from the PBX 200.

The PBX 200 selects time slots for digital traffic and frequencies for analog traffic. The PBX 200 can be a conventional subscriber switch, for example the Businessphone 250 produced by Ericsson Schrack. The PBX 200 is advantageously configured for connection to an Integrated Services Digital Network (ISDN) on the network side. On the subscriber side, the PBX 200 can be configured to support a plurality of analog telephone terminations. For example, as shown in FIGS. 1 and 2, the PBX 200 can support ninety-six analog telephone terminations on the line side, with ninety-five terminations reserved for subscribers and one termination reserved for maintenance. The PBX 200 is connected to the analog phone terminals 100 through analog extension boards.

The CU 300 manages the fixed cellular terminals and provides the required signal conversions to establish and terminate calls from/to the PBX 200 through the cellular network. In addition, the CU 300 manages all the necessary information required for establishing and authenticating calls for the cellular subscriptions. The CU 300 includes T1 drop and insert (TDI) boards and a controller board. The TDI boards are used for digital to analog and analog to digital conversion between time slots selected by the PBX 200 and the fixed cellular terminals, providing the physical interface between the trunk board in the PBX 200 and the fixed cellular terminals. The controller board provides the processing, memory and control functions required to manage the system's operation.

The terminal unit 410 is preferably an assembly housing several standard Digital Advanced Mobile Phone System (D-AMPS) transceivers or FCTs. For example, as shown in FIGS. 1 and 2, the terminal unit 410 contains sixteen FCTs. Outputs are provided on the FCTs for connection to the RF unit 420. In addition, each FCT provides a serial interface to the CU 300, via link-layer and higher layer protocols.

The FCTs preferably operate as much as possible in a normal mobile cellular terminal mode, only notifying the CU 300 of call progress status. The FCTs pause during any process that pertains to any of the supported specific Mobile Station Identifications (MSIDs). At that point, a "personality" is sent by the CU 300 to one of the FCTs. The personality consists of the MSID and its associated authentication parameters and call preferences. The chosen FCT uses the "personality" for the remainder of the transaction. At the end of the transaction the chosen FCT returns to a control channel monitoring mode, supporting a plurality of possible identities.

The RF unit 420 is a combiner/splitter that interfaces the terminal unit 410 to an antenna 430. The antenna ports of the D-AMPS transceivers or FCTs provide the connection of the terminal unit 410 to the RF unit 420. The connection from the RF unit 420 to the antenna 430 can be via a conventional connector, for example an N(F) type connector.

The antenna 430 communicates with the base station 500. The antenna 430 can be any commercially available directional antenna, preferably having a gain of nine decibels or more.

Referring to FIG. 2, when a call origination is requested from an analog terminal 100, the PBX 200 instructs the CU 300. The CU 300 will pass the dialed digits and other information to the next free cellular terminal in the terminal unit 410 for processing. Authentication and registration parameters updated as a result of the call will be transferred back to the CU 300 when the call is released.

FIG. 3 illustrates how an incoming modem call is handled by the multi-line terminal system. Before an incoming modem call is received, an analog terminal 100 goes offhook and indicates this to the PBX 200. Next, a predetermined digit, e.g., "9", is entered at the analog terminal, to establish set up with the CU 300 via the PBX 200. Although not shown, the analog terminal 100 may also establish contact with the PBX 200 and CU 300 by simply going off-hook, as is the case with a residential phone.

Next, the analog terminal 100 transmits a predetermined string of digits, e.g., "*1", to the CU 300 via the PBX 200. It will be understood that the digit string is not limited to this length or to these particular digits, but can include different digits. Then, the analog terminal 100 goes on-hook, and the PBX 200 sends a disconnect signal to the CU 300. The CU 300 then sends a release signal to the PBX 200, which the PBX acknowledges. Next, the CU 300 recognizes the predetermined string of digits as a request to request an analog channel for the next incoming call for that associated MIN.

When a page or a notification of an incoming call with a particular MSID is received from the base station 500, the page is transmitted to the terminal unit 410 and matched with a corresponding MSID. The page is rejected by all the FCTs except for the one that is chosen to complete the call. The CU 300 transposes the MIN to a corresponding PBX number and executes an authentication algorithm. Then, the CU 300 sets a response personality in the chosen FCT, as explained above, setting a call type parameter to be analog. A page response is then sent to the modem user through the base station 500. The page response includes a request to establish an analog channel.

Next, when the base station 500 assigns an analog channel, an Initial Voice Channel Designation (IVCD) signal is sent to the terminal unit 410, and a new analog channel is established. At this point, a signal is sent from the terminal unit 410 to the CU 300 indicating that an order is being waited for. When an alert signal representing an order is received from the modem user via the base station 500, it is transmitted to the terminal unit 410. The terminal unit 410 then sends a signal to the CU 300 indicating the alert signal has been received, and the CU 300 orders the PBX 200 to set up a connection. The PBX 200 confirms to the CU 300 that the connection has been set up.

The PBX 200 sends a signal to the analog terminal 100 to begin ringing and alerts the CU 300. In response to the ringing, a user of the analog terminal 100 causes it to go off-hook, and the analog terminal transmits a signal indicating this to the PBX 200. The PBX 200 then sends a connect signal to the CU 300. The CU 300 acknowledges the connect signal and instructs the chosen FCT to answer the call. The chosen FCT sends a connect signal to the base station 500, which responds with an acknowledgement. The chosen FCT then indicates to the CU 300 that its voice channel status is ready for conversation, and the CU 300 performs authentication. An analog channel is then established as a path between the incoming modem call and the analog terminal 100. The CU 300 automatically resets the mode to digital for the next page.

FIG. 4 illustrates how an incoming modem call time-out is performed by the multi-line terminal system. Referring to FIG. 4, once the initial steps of a modem incoming call procedure are performed, a time-out period is set for a page to be received. That is, once an analog terminal 100 has gone off-hook, sent the predetermined digits to the PBX 200 to establish set up and a request for an analog channel in the CU 300, and has gone on-hook again, a timer is set. The timer can, for example, be included in the CU 300. The timer runs for a time-out period configurable in the CU 300 to any period desired. During the time-out period, the next page received will be request to be analog in the page response. Once the time-out period has expired, the CU 300 resets to the digital mode for the next incoming call. In this way, the CU 300 will not indefinitely request an analog channel.

FIG. 5 illustrates how a modem call is originated from the multi-line terminal system to an outside party. Referring to FIG. 5, the same initial steps are performed as in the process for receiving an incoming modem call described above with regard to FIG. 3. That is, an analog terminal 100 goes off-hook and indicates this to the PBX 200. Next, a predetermined digit, e.g., "9", is entered at the analog terminal, to establish set up with the CU 300 via the PBX 200. As noted above, the analog terminal 100 may also establish contact with the PBX 200 and CU 300 by simply going off-hook, as is the case with a residential phone. Next, the analog terminal 100 transmits a predetermined string of digits, e.g., "*1", to the CU 300 via the PBX 200. For convenience, the same predetermined string of digits may be used for originating a modem call as in the procedure for receiving an incoming modem call described above. The CU 300 recognizes the predetermined string of digits as a request to reserve an analog channel.

Then, instead of the analog terminal 100 going on-hook, and the CU 300 releasing the PBX 200, the CU 300 prepares to treat the remaining digits from the analog terminal 100 as an outgoing dial string. A user at the analog terminal 100 then enters a phone number, e.g., "5678", which is transmitted to the CU 300 via the PBX 200. After the phone number has been entered, the user enters a predetermined digit, e.g., "#", to indicate that the dialing is complete, which is transmitted to the CU 300 via the PBX 200. The CU 300 responds with a call proceeding signal.

The CU 300 then transposes the PBX number to an MIN number, and sends a signal to the terminal unit 410 to originate a call. Next, the CU 300 executes an authentication algorithm and sets a response personality in the chosen FCT, as explained above, setting a call type parameter to be analog. An origination signal is then sent to the outside user through the base station 500.

When the outside user responds, and the base station assigns an analog channel, an IVCD message is sent from the base station 500 to the chosen FCT, and a new analog channel is established. The chosen FCT then indicates to the CU 300 that it is in a conversation mode. The CU 300 sends a connect instruction to the PBX 200 and performs authentication. The PBX 200 acknowledges the connect instruction, and an analog channel is established as a path between the outgoing modem call from the analog terminal 100 to an outside user.

A time-out procedure, as described above with regard to FIG. 5, may also be applied in an outgoing modem call procedure. For example, if the predetermined digit, e.g., "#", is not entered a predetermined time after the last dialed digit, call set up is abandoned. This frees the CU 300 from waiting indefinitely for a dialing procedure to be completed.

FIG. 6 illustrates how an incoming or an outgoing FAX call is handled by the multi-line terminal system. Referring to FIG. 6, a digital audio path is assumed to be open prior to the receipt or origination of a FAX call. When the terminal unit 410 detects incoming or outgoing FAX start tones it mutes the audio path. Next, the terminal unit 410 sends a signal to the base station 500 requesting an analog channel. Once the request for an analog channel is successful, the base station 500 acknowledges the request and hands off the incoming or outgoing FAX call to an analog channel. A new analog channel is thus established. The terminal unit 410 sends a signal to the control unit 300 indicating that the voice channel status is analog, with no action required by the control unit 300. Finally, the audio path is reopened across an analog channel.

The MLT has applications in both multi-unit residential and office environments. Operation is nearly the same for both applications. For residential applications, the PBX 200 is initialized such that all calls are treated as outside calls. That is, calls from one extension to the other are routed through the cellular network. For office applications, the PBX 200 is initialized to operate as a traditional PBX. Calls can be made from one extension to another using short number dialing, without any signaling to the RCS. In addition, by dialing an appropriate prefix, e.g., "9", the user can make an outside call through the cellular network.

Although the invention has been described above in terms of a multi-line terminal system, it is also applicable in a single-line terminal (SLT) system. In an SLT system, a single cellular terminal, a control unit and a single telephone interface are used. The SLT system does not require a PBX. The SLT functions similarly to the MLT system, except that the CU 300 communicates directly with the analog terminal 100.

It will be understood that the invention is not limited to the particular embodiments that are described and illustrated above. This description contemplates any and all modifications that fall within the spirit and scope of the invention as defined by the following claims.

What is claimed is:

1. In a cellular network comprising at least a base station and a plurality of cellular terminals, a method of transmitting analog tone data between an analog terminal and a cellular terminal via a fixed cellular terminal supporting both analog and digital voice channels and the base station, the method comprising the following steps:

requesting an analog channel over which to transmit the analog tone data via the fixed cellular terminal supporting both analog and digital voice channels and the base station, before the analog tone data is transmitted;

establishing an analog channel in response to the request for an analog channel; and transmitting the analog tone data between the cellular terminal and the analog terminal over the established analog channel via the fixed cellular terminal supporting both analog and digital voice channels and the base station.

2. The method of claim 1, wherein the analog tone data is modem data and the step of requesting an analog channel is performed in response to notification from the analog terminal to request an analog channel.

3. The method of claim 2, wherein the notification comprises a predetermined digit string.

4. The method of claim 1, wherein the analog tone data is fax data, and the step of requesting an analog channel is performed, in response to receipt of fax start tones by the fixed cellular terminal.

5. In a cellular network comprising at least a base station and a plurality of cellular terminals, a multi-line terminal system for transmitting analog tone data to and from the cellular terminals, the multi-line terminal system comprising:

a plurality of analog terminals;

a plurality of fixed cellular terminals supporting both analog and digital voice channels;

a private branch exchange (PBX);

a control unit;

a radio frequency (RF) unit; and an antenna;

wherein, prior to transmitting analog tone data between a cellular terminal and an analog terminal via a fixed cellular terminal, the control unit or the fixed cellular terminal sends a request for an analog channel to the base station, the base station establishes an analog channel in response to the request, and the analog tone data is transmitted between the cellular terminal and the analog terminal over the established analog channel via the antenna, the RF unit, the fixed cellular terminal, the control unit and the PBX.

6. The multi-line terminal system of claim 5, wherein the analog tone data is modem data, and the control unit sends a request for an analog channel to the base station in response to a notification from the analog terminal to request an analog channel.

7. The multi-line terminal system of claim 6, wherein the notification comprises a predetermined digit string.

8. The multi-line terminal system of claim 5, wherein the analog tone data is fax data, and the fixed cellular terminal sends a request for an analog channel to the base station upon detection of fax start tones.

* * * * *